Dec. 10, 1946.  C. C. S. LE CLAIR  2,412,277
HYDRAULIC DAMPING DEVICE
Filed May 28, 1943  3 Sheets-Sheet 1

Inventor
Camille Clare Sprankling Le Clair
By Williams, Bradbury & Hinkle
Attorneys.

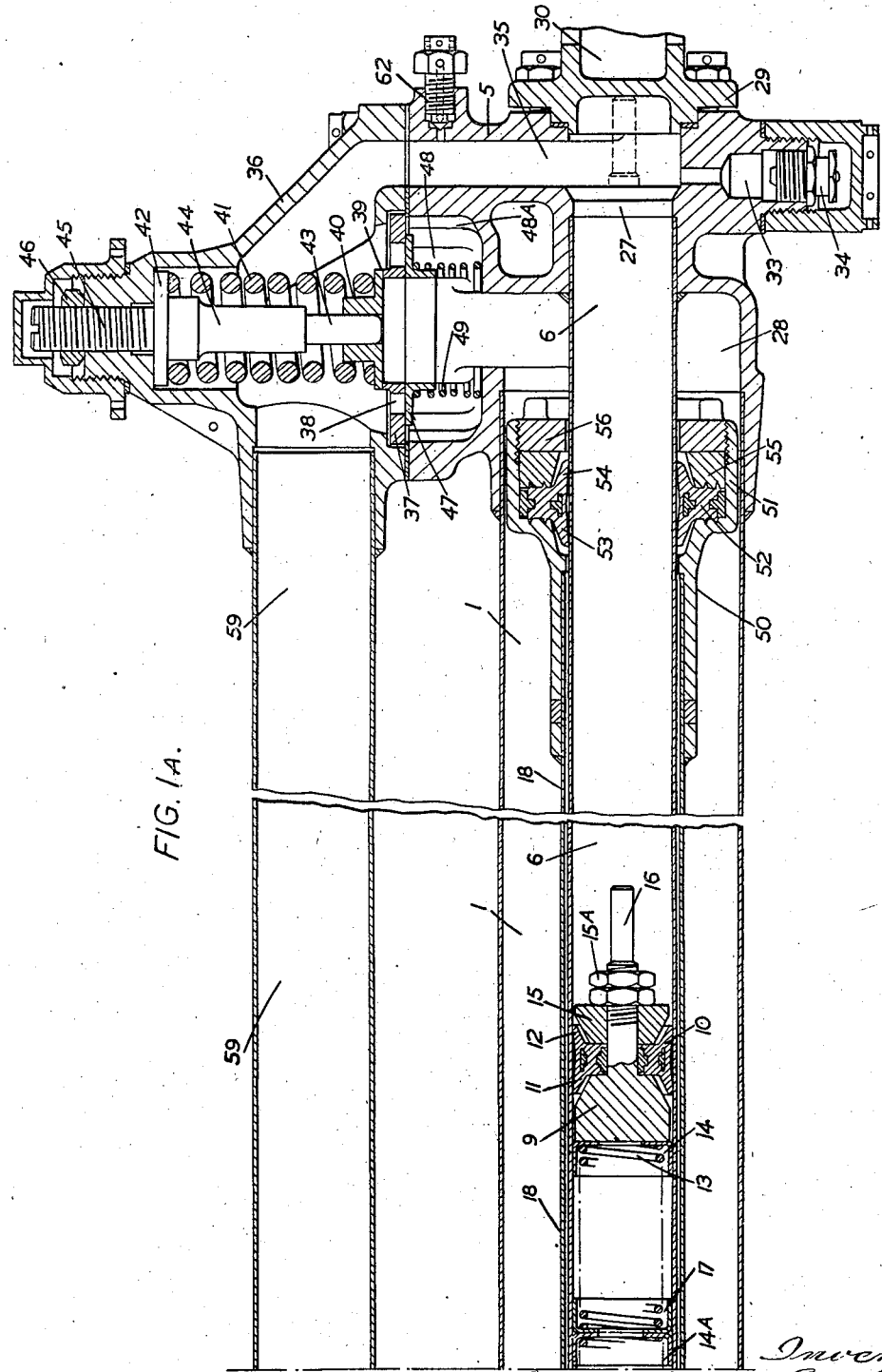
FIG. IA.

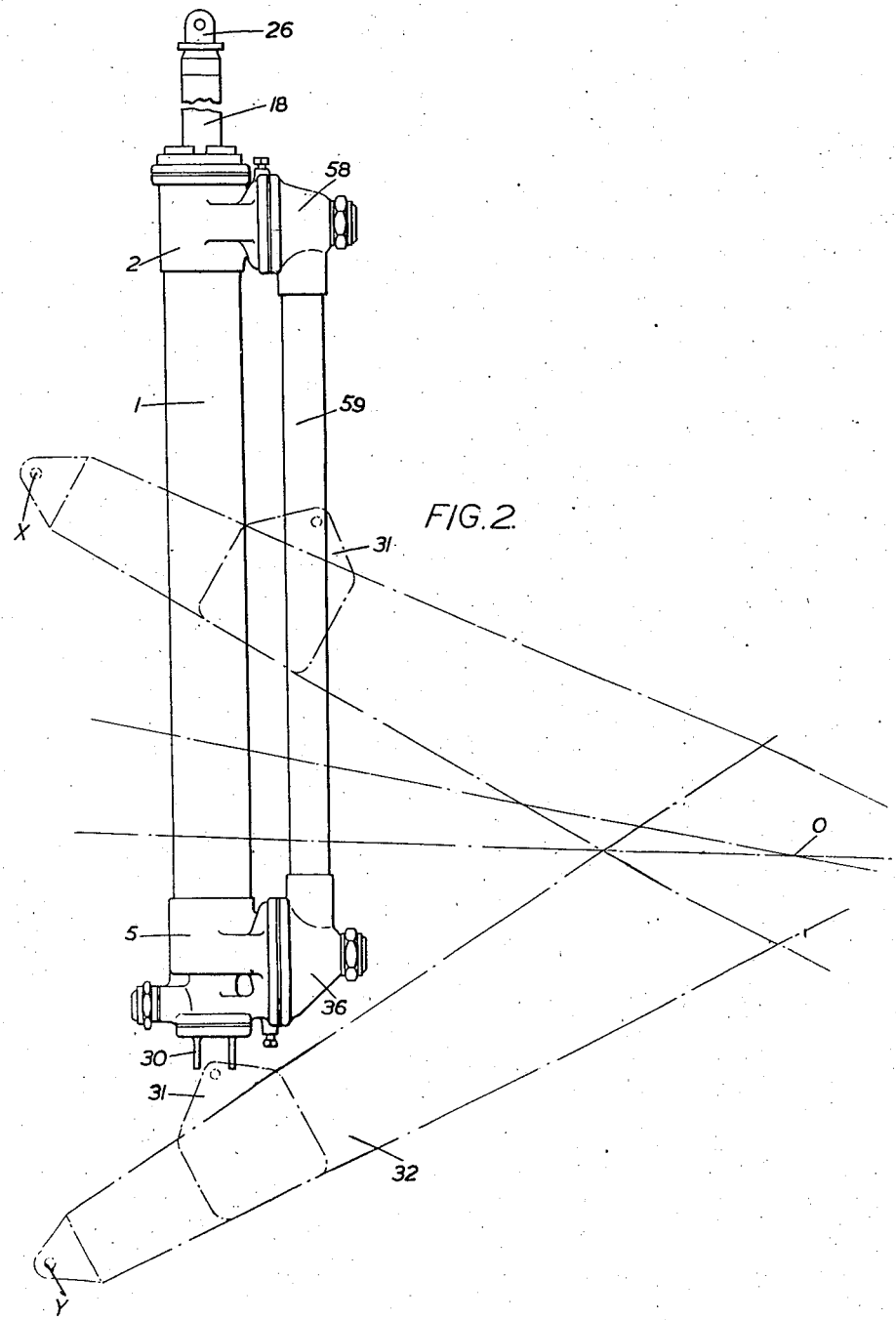

Patented Dec. 10, 1946

2,412,277

UNITED STATES PATENT OFFICE 2,412,277

HYDRAULIC DAMPING DEVICE

Camille Clare Sprankling Le Clair,
Acton, London, England

Application May 28, 1943, Serial No. 488,935
In Great Britain June 5, 1942

4 Claims. (Cl. 188—97)

This invention relates to hydraulic damping devices, of the general type comprising two telescopically arranged members, one, or both, of which may be connected to a member, or members, whose movements are to be damped, and a piston which is adapted to displace the liquid in the circuit from one side to the other of the piston.

A hydraulic damping device according to this invention comprises a main or operating cylinder which is adapted to be operably connected to an anchorage, or to the member whose movements are to be damped, a main or operating piston which is slidable within the cylinder and is adapted to be operably connected to the said member or said anchorage and to displace liquid from one side of the piston to the opposite side, and means which is adapted to resist the transfer of liquid from one side of the piston to the other side thereof and which is so constructed and arranged that the magnitude of the damping action is dependent primarily upon the resistance offered by said means to the flow of liquid and not upon the viscosity of the liquid.

It is to be understood that the anchorage referred to above may be a fixed or movable anchorage.

The said liquid-transfer resisting means may consist of a valve adapted to open and close an orifice through which the displacement of the liquid from the operating cylinder takes place, the said valve being loaded by a spring of such a rating that when the valve is on its seat, little or no load is applied by the spring, and when the valve is lifted to the full extent the load applied is such as to exert the maximum desired resistance to the flow of liquid through the said orifice. In this manner, the force opposing the movement of the piston in its cylinder, i. e., the damping effect, is substantially proportional to the rapidity of displacement of the liquid or, in other words, of the piston. The effect of viscosity is therefore substantially negligible. The energy absorption is provided by the work done by the liquid in forcing itself past the valve against the force of the controlling spring, this being in contradistinction to known means wherein the energy absorption is due to the viscous flow of liquid through one or more orifices.

As a modification, use may be made of a disc valve fixed at the centre and free at the edge, the said valve having sufficient inherent resiliency and resistance to perform the function required without using a separate spring.

The constructional form of the invention which will be described hereinafter is particularly applicable to the damping of the movements of a member oscillatably mounted upon the fuselage of an aircraft and to which one end of a tow rope is secured, the object of the damping device being to absorb the inertia energy transmitted through the said member and to cause the member to take up new positions gradually without shock and without surge.

Briefly, this construction comprises two headers one of which is connected to an oscillating member, the headers being arranged at opposite ends of an operating or main cylinder in which is slidable an outer or main piston connected to an outer tube fastened to a fixed anchorage on the fuselage. The telescopic movements of the cylinder and outer tube and piston, due to the oscillation of the said member, cause the liquid in the cylinder to be displaced, the liquid circuit being completed through a transfer tube and the displacement of liquid from one side to the other of the piston being resisted by spring-loaded or inherently-resilient valves as described above, said valves being arranged adjacent to the opposite ends of the transfer tube.

Means, acting as a pressure accumulator, are also provided for compensating for the differential displacement of the operating piston and for putting the liquid under initial pressure and compensating for the effect of temperature changes upon the liquid.

One constructional form of the invention, adapted to damp the movements of a member oscillatably mounted upon the fuselage of an aircraft and to which one end of a glider tow rope is secured, is hereinafter described, by way of example, with reference to the accompanying drawings, whereon:

Fig. 1A is a sectional elevation of the bottom part of the device; and

Fig. 2 is an outside elevation thereof.

Figure 1:
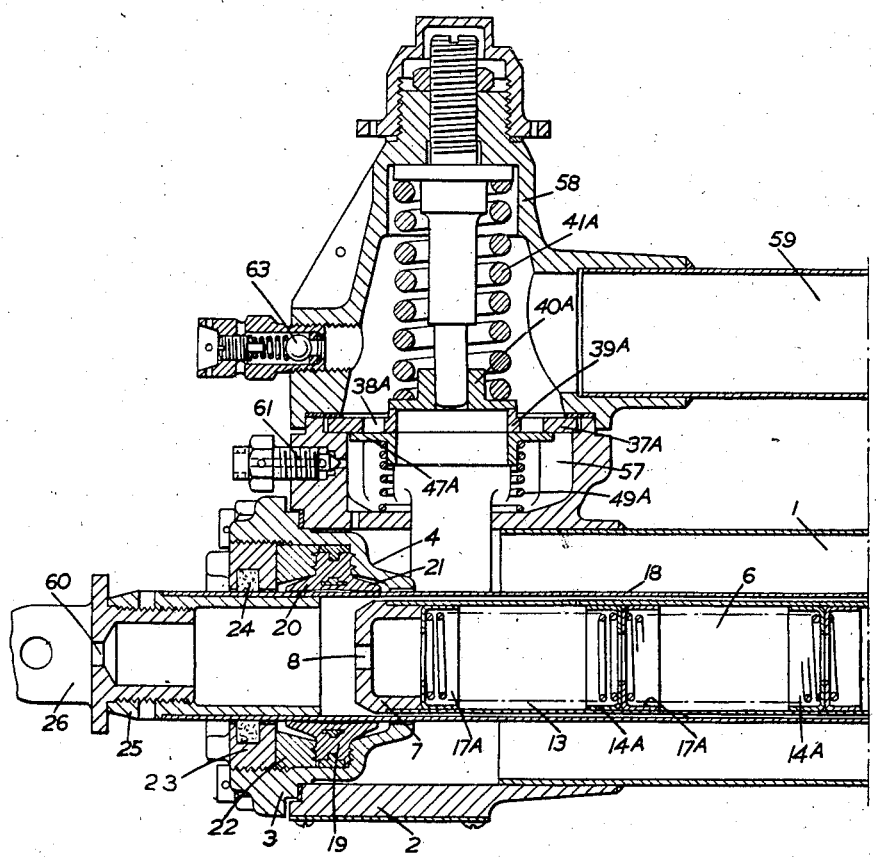
Fig. 1 is a sectional elevation of the upper part of the device.

Referring to the drawings:

The object of the device is to absorb the inertia energy transmitted through the said member oscillatably mounted upon the fuselage and to cause the member to take up new positions gradually and without shock or surge.

The device comprises an operating cylinder 1, on to the upper end of which is secured a tubular upper header 2 fitted at the top with a hollow cap 3 having an apertured bottom wall 4. The bottom end of the said cylinder is fitted within a bottom header 5 which is described hereinafter. The bottom end of an inner tube 6 is fixed in a seating provided in the bottom header and its upper end is provided with an inverted cup 7 having a hole 8 in its end wall. An accumulator piston 9 comprising a metal-reinforced rubber sealing member 10 having two sealing edges 11 and 12 is slidably arranged in the inner tube 6 and is normally forced downwards therein by means of a number of coaxial coil springs 13 disposed in the tube between the piston 9 and the said cup 7. The bottom end of the lowermost spring 13 is seated in a cup 14 bearing against the piston 9 against which the said sealing member is clamped by a clamping member 15 mounted upon a rod-like extension 16 of the piston and forced against the sealing member by nuts 15A. The said cup 14 is slidably guided in the tube 6 and the upper end of the spring is arranged in an inverted, apertured cup 17 slidable in the tube. Each of the other springs 13 is fitted at its lower end in an apertured, slidable cup 14A with an upwardly-directed skirt, and at its upper end in a similar cup 17A with a downwardly directed skirt. The top cup 17A of the upper spring bears against the cap 7 at the top of the inner tube 6.

The advantage of this arrangement is that by using a plurality of springs, the length/diameter ratio of the individual springs may be so chosen that the spring is free from any appreciable tendency to lateral buckling. Should such buckling occur, a large and indeterminate frictional component would be superimposed on the normal action of the spring. By this arrangement, a long, relatively narrow spring which would be seriously unstable laterally is replaced by a number of laterally stable relatively short springs having the same degree of resiliency as the single spring.

An outer tube 18 is slidable through the opening in the end of the hollow cap 4 in the end of the top header 2, a metal-reinforced rubber sealing member 19 having two sealing edges 20 and 21 being arranged in the cap and fixed therein by a clamping member 22 and a cover 23 closing the end of the cap. The cover is formed with an annular recess surrounding the tube and packed with dirt excluding packing 24 such as felt. A cap 25 comprising a forked connecting member 26 is fixed in the upper end of the outer tube 18, and is pivotally connected to a suitable fixed part of the aircraft (not shown).

The bottom header 5 is of box form and it comprises a lower passage 27 forming the seating for the bottom end of the inner tube 6 and, before the latter is fitted, communicating at its top end with the interior of the hollow body part 28, which is of greater area. The bottom of the said passage 27 is closed by a plug 29 formed externally with a fork 30 to which a member 31 on an oscillating lever 32 is pivotally attached, as shown in Fig. 2. An oil inlet 33, fitted with a filler nipple 34, communicates with the said passage 27 and the latter also communicates with a transverse passage 35 leading to a valve box 36 which is secured to a lateral face of the bottom header. A valve seat 37 is held between the contacting faces of the bottom header and valve box, the said seat being in the form of a disc, which is provided with a number of holes 38, and with a central apertured collar 39 extending into the valve box. A flat valve 40, guided for movement towards and from the end of the collar 39, is normally pressed on to the said end by a coil spring 41 arranged between the flat valve and a shoulder 42 on a valve guide 43. The spring 41 is of such a rating that when the valve is on its seat, little or no load is applied by the spring, and when the valve is lifted to the full extent the load applied is such as to exert the maximum desired resistance to the flow of liquid through the apertured collar 39. The guide comprises an inwardly extending stem 44 on one side of the shoulder and an outwardly extending stem 45 which is screwed into the outer wall of the valve box. By this construction, the initial loading of the valve spring 41 can be adjusted by screwing the valve guide 43 inwards or outwards and a lock nut 46 on the screwed part of the guide serves to fix the latter in any of its adjusted positions. The holes 38 in the said disc valve seat 37 are adapted to be closed by a large flat valve 47 which is arranged at the opposite side of the seat in a lateral cavity 48 provided in the bottom header and in communication with the interior of the body 28 of the header. A coil spring 49 of light rating is arranged in the said cavity and acts to press the flat valve 47 relatively lightly on to its seat so as to close the holes 38 in the valve seat. When lifted off its seat the valve is guided by ribs 48A in the cavity 48. An operating piston 50 is fitted on the bottom end of the outer tube 18 and comprises a piston part 51 which is of cup form and is slidable in the operating cylinder 1, a metal-reinforced rubber sealing member 52, having two sealing edges 53 and 54, being arranged in the skirt part of the cup and secured therein by a clamping member 55 fixed by an apertured cover 56 closing the end of the cup. The said sealing member acts to prevent oil leakage past the piston along the inner tube.

The top header 2 is provided with a lateral cavity 57, which communicates with the interior of the header above the top of operating cylinder 1 and is closed by a valve box 58 similar in construction to the bottom valve box 36 and also containing identical valve, valve seat and spring mechanisms 40a, 47a, 37a, 41a and 49a. The springs 49 and 49a are adapted to load the valves 47 and 47a at a less pressure than the piston 9 is loaded. The interiors of the top and bottom valve boxes 36 and 58 are connected by a transfer tube 59. The hole 60 in the cap 25 at the top of the outer tube 18 acts in conjunction with the hole 8 in the cap 7 on the inner tube to put the interior of the latter above the piston 9 in communication with atmosphere.

In operation, the oscillation of the said member 32, see Fig. 2, pivotally attached to the bottom header 5 causes the latter, the operating cylinder 1, the top header 2, the inner tube 6 and the accumulator piston 9, the two valve boxes 36 and 58 and the transfer tube 59 to be moved relatively to the outer tube 18 and operating piston 50. The annular space between the cylinder 1 and the outer tube, the headers, the valve boxes, the transfer tube and the inner tube are filled with a suitable liquid, such as oil. Assuming that the oscillating member 32 is moved downwards from the position OX, liquid on top of the operating piston 50 is transferred upwards in the cylinder 1 and through the top header and, after having forced the flow-resisting valve 40a off its seat 37a, flows through the transfer tube 59 into the bottom valve box 36. The liquid forces the larger flat valve 47 in the bottom valve box off its seat and is transferred through the holes 38 in the valve seat 37 into the space 28 in the bottom header around the inner tube and into the cylinder 1 below the operating piston 50. Owing to the difference in the area of the annular spaces above and below the outer piston, the volume of liquid displaced above the piston is less than that entering the cylinder below. This deficiency is made up by the spring-pressed accumulator piston 9 displacing the necessary quantity of make-up liquid from the inner tube 6 into the bottom header and thence into the valve box and through the holes 38 below the operating piston 50. The converse takes place when the oscillating member 32 is rocked in the opposite direction, the inner tube 6 then receiving the excess liquid displaced below the operating piston via the passage 35. The spring-loaded inner piston 9 functions as an accumulator piston and acts to put the liquid in the tube 6 under initial pressure and to compensate for any changes in the temperature of the liquid, as well as acting as a liquid volume compensator.

It will be appreciated that the reverse action takes place when the oscillating member rocks in the opposite direction from the position OY in which case liquid is displaced from below the operating piston above it. In both cases, the damping action is brought about by the resistance offered to the transfer of the liquid from above (or below) to below (or above) the operating piston 50 by the said smaller flat valves 40a and 40, which are loaded by the springs 41a and 41. By this means, the magnitude of the damping action is dependent primarily upon the force exerted by the valve loading and not upon the viscosity of the liquid. In other words, the energy absorption is provided by the work done by the liquid in forcing itself past the valve 40a or 40 against the opposing force of the loading spring 41a or 41, in contradistinction to known damping means wherein the energy absorption is due to the viscous flow of liquid through one or more orifices.

In the event of the loss of liquid from the device by leakage, for example, the piston 9 might be thrust so far downwards by its springs that the end of its extension 16 would act as a stop and engage with the cap 29, thus preventing the edges 11 and 12 of the sealing ring 10 becoming disengaged from the bore of the inner tube 6.

It will be understood that the damping device is equally applicable to the damping of the movements of two members each movable relatively to the other. The device can also be arranged horizontally or at any other angle to the vertical, and the oscillating member 32 can obviously be connected to the operating piston and the bottom header 5 to a fixed anchorage.

In order to vent air from the device when the latter is being filled with liquid, the headers 2 and 5 are respectively provided with screwed air-vent valves 61 and 62. As the device is usually filled with liquid under high pressure supplied through the nipple 34, a spring-loaded liquid relief valve 63 is fitted to the valve box 58.

It will be obvious that the invention is adapted to be used for purposes other than that specifically described above.

I claim:

1. A damping device of the class described, comprising an operating cylinder having an operating piston therein and provided at each end with a hollow header, a passageway in each of said headers communicating with the interior of said operating cylinder, a transfer conduit connecting said passageways in the two headers, a flow-resisting valve disposed in each of said passageways between the end of said operating cylinder and adjacent end of said transfer conduit, so that liquid displaced in said operating cylinder by said piston must first open one of said valves before it can enter said transfer conduit, a piston rod which projects through one end of said operating cylinder and which serves to connect said operating piston to an anchorage or to a member whose movements are to be damped, and resilient means for compensating for the differential action of said operating piston and for the effect of temperature changes of the liquid by maintaining the liquid under pressure, said resilient means comprising a spring-pressed accumulator piston slidable in a liquid-containing cylinder which communicates at one end with said transfer conduit between said passageways and said flow-resisting valves in said headers, said operating piston being tubular and being slidably mounted upon said liquid-containing cylinder.

2. A damping device of the class described, comprising an operating cylinder having an operating piston therein and provided at each end with a hollow header, a passageway in each of said headers communicating with the interior of said operating cylinder, a transfer conduit connecting said passageways in the two headers, a flow-resisting valve disposed in each of said passageways between the end of said operating cylinder and adjacent end of said transfer conduit, so that liquid displaced in said operating cylinder by said piston must first open one of said valves before it can enter said transfer conduit, a piston rod which projects through one end of said operating cylinder and which serves to connect said operating piston to an anchorage or to a member whose movements are to be damped, and resilient means for compensating for the differential action of said operating piston and for the effect of temperature changes of the liquid by maintaining the liquid under pressure, each of said flow-resisting valves being adapted to open and close an aperture in a valve seat, said valve seat also being formed with a number of holes adapted to be opened and closed by a non-return valve normally held closed by a spring applying less pressure to said non-return valve than the pressure created by said resilient means, each of said non-return valves acting to allow liquid displaced into said transfer conduit from one end of said operating cylinder by said operating piston to flow into the opposite end of said operating cylinder.

3. A damping device of the class described, comprising an operating cylinder having an operating piston therein and provided at each end with a hollow header, a tube on which said operating piston is mounted projecting out of the device through one of said headers and which is provided with means whereby it may be attached to an anchorage or to a member whose movements are to be damped, said header at the opposite end of said operating cylinder being provided with means whereby it may be attached to the member whose movements are to be damped or to an anchorage, a passageway in each of said headers communicating with the interior of said operating cylinder, a transfer conduit connecting said passageways in the two headers, a flow-resisting valve disposed in each of said passageways between the end of said operating cylinder and adjacent end of said transfer conduit, so that liquid displaced in said operating cylinder by said piston must first open one of said valves before it can enter said transfer conduit, and resilient means mounted within a cylinder adapted to be telescoped into said tube for compensating for the differential action of said operating piston and for the effect of temperature changes of the liquid by maintaining the liquid under pressure.

4. A damping device of the class described, comprising an operating cylinder having an operating piston therein and provided at each end with a hollow header, a passageway in each of said headers communicating with the interior of said operating cylinder, a transfer conduit connecting said passageways in the two headers, a flow-resisting valve disposed in each of said passageways between the end of said operating cylinder and adjacent end of said transfer conduit, so that liquid displaced in said operating cylinder by said piston must first open one of said valves before it can enter said transfer conduit, resilient means for compensating for the differential action of said operating piston and for the effect of temperature changes of the liquid by maintaining the liquid under pressure, said resilient means comprising a spring-pressed accumulator piston slidable in a liquid-containing cylinder mounted within said operating cylinder and communicating at one end with said transfer conduit between said passageways and said flow-resisting valves in said headers, said operating piston being tubular and being slidably mounted upon said liquid-containing cylinder, and a tubular piston rod mounting said operating piston and telescoping over said liquid-containing cylinder, said tubular piston rod projecting out of the device through one of said headers and being provided with means whereby it may be attached to an anchorage or to a member whose movements are to be damped, said headers at the opposite end of said operating cylinder being provided with means whereby it may be attached to the member whose movements are to be damped or to an anchorage.

CAMILLE CLARE SPRANKLING LE CLAIR.